United States Patent [19]
Yoshikawa et al.

[11] Patent Number: 5,609,958
[45] Date of Patent: Mar. 11, 1997

[54] COATING AGENTS FOR ELECTROPHOTOGRAPHY CARRIERS AND ELECTROPHOTOGRAPHY CARRIER PARTICLES

[75] Inventors: Yuji Yoshikawa; Kouichi Tanaka; Kenji Yamamoto; Masaaki Yamaya, all of Gunma-ken, Japan

[73] Assignee: Shin-Etsu Chemical Co., Ltd., Tokyo, Japan

[21] Appl. No.: 573,579

[22] Filed: Dec. 15, 1995

Related U.S. Application Data

[63] Continuation of Ser. No. 429,870, Apr. 27, 1995, abandoned.

[30] Foreign Application Priority Data

Apr. 27, 1994 [JP] Japan .................................. 6-113508

[51] Int. Cl.⁶ ........................................................ B32B 15/08
[52] U.S. Cl. ........................... 428/402; 428/357; 428/447; 427/387; 528/17; 528/18; 528/21; 528/34; 528/14; 106/287.11; 106/287.12
[58] Field of Search ............................... 428/402, 357, 428/447; 427/387; 528/17, 18, 21, 34, 14; 106/287.11, 287.12

[56] References Cited

U.S. PATENT DOCUMENTS

| | | | |
|---|---|---|---|
| 4,049,873 | 9/1977 | Creasy et al. | 428/447 |
| 4,368,294 | 1/1983 | Deubzer et al. | 525/100 |
| 4,514,485 | 4/1985 | Ushiyama et al. | 430/106.6 |
| 4,604,443 | 8/1986 | Chang et al. | 528/28 |
| 4,927,728 | 5/1990 | Isoda et al. | 430/108 |
| 5,068,301 | 11/1991 | Okamura et al. | 528/15 |
| 5,183,846 | 2/1993 | Aiba et al. | 524/865 |
| 5,310,842 | 5/1994 | Ichinohe et al. | 528/12 |
| 5,368,969 | 11/1994 | Yoshikawa et al. | 430/108 |
| 5,468,825 | 11/1995 | Takarada et al. | 528/15 |

FOREIGN PATENT DOCUMENTS

| | | |
|---|---|---|
| 0351712 | 1/1990 | European Pat. Off. . |
| 0469624 | 2/1992 | European Pat. Off. . |
| 0535598 | 4/1993 | European Pat. Off. . |

*Primary Examiner*—Margaret W. Glass
*Attorney, Agent, or Firm*—Millen, White, Zelano, & Branigan, P.C.

[57] ABSTRACT

This invention offers the coating agents in order to manufacture electrophotography carrier particles with a superior endurance. Coating agents for the electrophotography carriers which are characterized by having the organopolysiloxane expressed by the general formula below:

$$R_a^1 Si(OR^2)_b (OR^3)_c (OR^4)_d O_{(4-a-b-c-d)/2}$$

wherein $R^1$ is an organic group with 1 to 12 carbon atoms; $R^2$ is $-C_m H_{2m+1}$ as herein $m \geq 3$; $R^3$ is $-C_n H_{2n+1}$ as herein n is either 1 or 2; $R^4$ is in each case a hydrogen atom or group expressed by formulae (1) and (2) below; and subscripts a, b, c, and d are numbers which satisfy the following conditions of $0.5 < a < 2$, $0 < b \leq 3$, $0 < c \leq 3$, $0 < d \leq 0.5$ and $0.5 < a+b+c+d \leq 4$.

$$-\underset{\underset{C_2H_5}{|}}{\overset{\overset{R_x^5}{|}}{Si}}-(ON=C-CH_3)_{3-x} \quad (1)$$

and $$-\underset{\underset{CH_3}{|}}{\overset{\overset{R^5}{|}}{Si}}-(OC=CH_2)_2 \quad (2)$$

$R^5$ in the above formulae (1) and (2) is an organic group with 1 to 6 carbon atoms and x in the formula (1) satisfies $1 \leq x \leq 2$.

21 Claims, No Drawings

COATING AGENTS FOR ELECTROPHOTOGRAPHY CARRIERS AND ELECTROPHOTOGRAPHY CARRIER PARTICLES

This application is a continuation of application Ser. No. 08/429,870, filed Apr. 27, 1995, now abandoned.

BACKGROUND OF THE INVENTION

The invention relates to coating agents for electrophotography carriers, particularly coating agents for electrophotography carriers which enable preparation of carrier particles with a stable charge amount, without being susceptible to the spent phenomenon, over a long duration as well as superior endurance.

As is well known, developers for the two component type dry copying machine contain two main particulate components: fine particulate toners and larger sized carrier particles. Mixing and stirring of these two components together causes friction and each toner particle and each carrier particle becomes electrostatically charged with different signs from each other. The visible image is formed by electrostatically depositing the charged toner particles on an electrostatic latent image formed on a photosensitive substance. Copying is completed by transferring this image to a transfer sheet and fixing it.

In this case, oxidized or unoxidized iron powders are usually used as carrier particles. However, when these carriers are utilized, as they are, by mixing with the toner, their triboelectric properties towards the toner are insufficient. In addition, during use, the toner particles tend to stick to the surface of the carrier particles forming a toner film thereon (which is called "spent phenomenon"). As a result, the charge characteristics of the carrier disadvantageously vary with time, and the lifetime of the developer becomes shortened. Further, another disadvantage is a large difference in the carrier charge characteristics under dry and humid conditions.

In order to prevent such demerits, carrier surfaces have been covered with resins such as acrylic resins, styrene-acryl copolymers, silicone resins, polyester resins and fluorine resins. However, in the case of using polyester resins having hydroxyl groups and acrylic resins as the coating, crosslinking is performed through the use of, for example, isocyanates and melamines. Incomplete crosslinking results in residual hydroxyl groups and isocyanate groups being present. This reaction progresses with time, which worsens the charge characteristics (Japanese Patent applications Kokai (laid open) 59-53875, and 60-59369).

Further, in the case of using acrylic resins and styrene-acryl copolymers as the coating, the initial charge characteristics are superior. However, the coating film tends to peel off from the particle nucleus due to poor adhesivity. On the other hand, the fluorine resins and silicone resins possess a low surface energy. Therefore, these coating agents are collecting attention from the viewpoint of reduced spent phenomenon (Japanese Patent applications Kokai 54-21730, 58-40557 and 59-131944, and Japanese Patent application Kokoku (examined) 59-26945; see also U.S. Pat. Nos. 4,514,485, 4,927,728, 5,068,301 and 5,368,969, and U.S. patent application Ser. No. 08/185,354 now U.S. Pat. No. 5,468,825).

Particularly, in the case of silicone resins, the selection of monomers leads to variety in the molecular structures. Therefore, their selection enables one to prepare carriers with various levels in the amount of charge. In addition, the silicone resins are soluble in many solvents, which leads to many working advantages such as a uniform coating on the carrier surface and curing at relatively low temperature.

On the other hand, a method has been proposed to control the charge amount by the silicone resins having tin compounds (Japanese Patent applications Kokoku 2-3181). This method, however, increases the charge amount disadvantageously as the number of copies made is increased.

SUMMARY OF THE INVENTION

The inventors of the present invention investigated strenuously to solve the above disadvantages. As a result, organopolysiloxanes were discovered which are suitable as coating agents for electrophotography carriers to achieve the present invention.

An object of the invention is to provide a coating agent for manufacturing electrophotography carrier particles with superior endurance. Another object of the present invention is to provide electrophotography carrier particles with little change in charge amount with time as well as exhibiting little spent phenomenon.

Upon further study of the specification and appended claims, further objects and advantages of this invention will become apparent to those skilled in the art.

These objects of the present invention are achieved by coating agents for electrophotography carrier particles which are characterized by having the organopolysiloxane expressed by the general formula below:

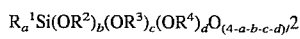

wherein $R^1$ is, in each case independently, an organic group with 1 to 12 carbon atoms; $R^2$ is, in each case independently, $-C_mH_{2m+1}$ wherein $m \geq 3$; $R^3$ is, in each case independently, $-C_nH_{2n+1}$ wherein n is either 1 or 2; $R^4$ is, in each case independently, a hydrogen atom or a group expressed by formulae (1) or (2) below; and subscripts a, b, c, and d are numbers which satisfy the following conditions: $0.5 < a < 2$, $0 < b \leq 3$, $0 < c \leq 3$, $0 < d \leq 0.5$ and $0.5 < a+b+c+d \leq 4$. The average molecular weight of the organopolysiloxane is preferably 5,000–100,000.

and

$R^5$ in the above formulae (1) and (2) is, in each case independently, an organic group with 1 to 6 carbon atoms and x in the formula (1) satisfies $1 \leq x \leq 2$.

The group $R^1$ is preferably a substituted, e.g., by halogen atoms, or unsubstituted alkyl, aryl or alkenyl group. Particularly preferred groups for $R^1$ are methyl, ethyl, propyl, butyl, methylphenyl, vinyl, allyl and 3,3,3-trifluoropropyl. The group $R^5$ is preferably alkyl, alkenyl or aryl, particularly methyl, phenyl or vinyl.

The group $R^2$ is not limited to specific groups, as long as $m \geq 3$. Preferably, subscript m is 3–8. From an industrial viewpoint, $-OR^2$ is preferably propoxyl, isopropoxyl, butoxyl, sec-butoxyl, tert-butoxyl, sec-amyl or tert-amyl.

When these functional groups —$OR^2$ exist at the ratio of at least 0.001 mol per 1 mol of Si atom, the charge amount can be prevented from charge build-up. On the other hand, more than three mols of these functional groups per one mol of Si atom impairs the curability, resulting in improper curing. Therefore, the content of these functional groups —$OR^2$ is preferably at most 0.5 mol per one mol of Si atom. In other words, the amount of alkoxyl groups —$OR^2$, is preferably 0.5–10.0 mol % relative to the organopolysiloxane resin.

The organopolysiloxanes of the present invention can be obtained by hydrolysis of chlorosilanes such as methyl trichlorosilane, dimethyl dichlorosilane, phenyl trichlorosilane, diphenyl dichlorosilane, and methyl phenyl dichlorosilane. However, it is difficult to control the amounts of alkoxyl groups and silanols by this method. Therefore, it is more desirable to prepare the organopolysiloxanes by hydrolysis of alkoxy silanes in the presence of acid or base catalysts.

Alkoxy silanes employed here are, for example, silanes having bulky alkoxyl groups such as methyl tripropoxy silane, methyl tributoxy silane, dimethyl dipropoxy silane, dimethyl dibutoxy silane, tetrapropoxy silane, and tetrabutoxy silane, and their partially hydrolyzed products. Further, the following alkoxy silanes and their partially hydrolyzed products may be employed in combination with such alkoxysilanes having bulky alkoxyl groups: methyl trimethoxy silane, methyl triethoxy silane, dimethyl dimethoxy silane, dimethyl diethoxy silane, phenyl trimethoxy silane, phenyl triethoxy silane, diphenyl dimethoxy silane, diphenyl diethoxy silane, methyl phenyl dimethoxy silane, methyl phenyl diethoxy silane, tetramethoxy silane, and tetraethoxy silane.

The organopolysiloxanes of the present invention may also be obtained from methyl trimethoxy silane, methyl triethoxy silane, dimethyl dimethoxy silane, dimethyl diethoxy silane, phenyl trimethoxy silane, phenyl triethoxy silane, diphenyl dimethoxy silane, diphenyl diethoxy silane, methyl phenyl dimethoxy silane, methyl phenyl diethoxy silane, tetramethoxy silane, and tetraethoxy silane and their partially hydrolyzed products. A part, or all, of the methoxyl and ethoxyl groups in these compounds are exchanged with higher alcohols such as n-propanol, i-propanol, n-butanol, i-butanol, and t-butanol, in the presence of acid or base catalysts, followed by hydrolysis in the presence of acid or base catalysts, to obtain the organopolysiloxanes.

The preparation of the organopolysiloxanes by hydrolysis in the presence of acid or base catalysts can be performed at, for example, room temperature or alcohol-reflux temperature. Preferred catalysts are hydrochloric acid, sulfuric acid and methanesulfonic acid. Further, these alkoxy silanes may be employed by mixing with silicone resins and silanes which are generally utilized. When $R^4$ in the general formula is a hydrogen atom, the organopolysiloxane having silanol groups is expressed by the general chemical formula below and these compounds, when mixed and reacted with crosslinking agents and curing catalysts, are particularly suitable as coating agents of electrophotography carriers in the present invention:

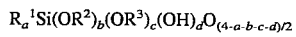

wherein $R^1$ through $R^3$ and subscripts a through d are as described above. The crosslinking reaction is preferably conducted at a temperature of about room temperature to 100° C.

Crosslinking agents employed in the present invention are preferably the crosslinking agents of oxime elimination type and of acetone elimination type. Suitable examples of these crosslinking agents are: methyl-tris(methyl ethyl ketoxime) silane, vinyl-tris(methyl ethyl ketoxime) silane, phenyl-tris(methyl ethyl ketoxime) silane, dimethyl-di(methyl ethyl ketoxime) silane, methyl-tris(isopropenoxy) silane, vinyl-tris(isopropenoxy) silane, and phenyl-tris(isopropenoxy) silane.

These compounds easily react with silanol groups within the organopolysiloxanes. In such a case, one mol of crosslinking agent reacts with one mol of silanol and the idea condition is that all the silanols are reacted. When the crosslinking agents are in shortage, a condensation reaction takes place between silanols, which produces high molecular weight products and causes gelation. Therefore, the amount of crosslinking agents is preferably 0.4–5 mols, more preferably 0.5–3 mols, per one mol of silanols in the organopolysiloxanes. Less than 0.4 mol promotes the condensation reaction between silanols, which increases the viscosity of the mixture and impairs the stability. On the other hand, more than 5 mols, while increasing stability, hinders the curability and weakens the coating film. The amount range of crosslinking agents can thus vary according to the amount of silanol groups in the organopolysiloxanes. However, ordinarily about 5–150 parts by weight are used per 100 parts by weight of the organopolysiloxane resins.

The reaction products with these crosslinking agents are expressed by the following chemical formulae (3) and (4):

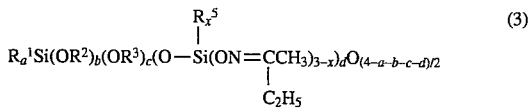

and

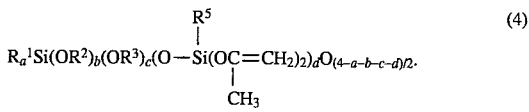

Further, the compounds expressed by the above formulae (3) and (4) may also be obtained by co-hydrolysis of the organopolysiloxanes along with crosslinking agents, such as oxime silanes and/or isopropenoxy silanes.

Curing catalysts employed in the present invention are compounds of tin, aluminum, titanium, zinc, cobalt, and iron, and amines. These may be used in combination together. Examples of suitable catalysts are: dibutyl tin diacetate, dibutyl tin dioctanoate, dibutyl tin dilaurate; aluminum alkoxides such as aluminum isopropylate; aluminum chelates such as aluminum acetyl acetonate, aluminum-di-n-butoxide monoethyl acetoacetate, and aluminum-di-isopropoxide monoethyl acetoacetate; octanoates, acetates, propionates, and naphthenates of aluminum, zinc, cobalt, and iron; tetrabutyl titanate or its homopolymer; tetraisopropyl titanate or its homopolymer; and γ-aminopropyl triethoxy silane, N-(β-aminoethyl) aminopropyl trimethoxy silane, γ-aminopropyl methyl diethoxy silane, and N-(β-aminoethyl) aminopropyl methyl dimethoxy silane.

Among the curing catalysts, organotin compounds and organoaluminum compounds are particularly desirable owing to their superior curability. In general, the amount of curing catalysts used is preferably 0.05–5.0 parts by weight with respect to 100 parts by weight of the organopolysiloxane resin. Further, in the present invention, the mixing of each component should be carried out under the inert gas atmosphere in order to prevent the water concerned reaction from proceeding.

Suitable carrier center particles for use in the invention are iron powder and ferrite powder. In addition, other known materials used as carrier center particles can be appropriately selected, for example: magnetic metals such as nickel and cobalt, and their oxides; copper; Carborundum; glass beads; and silicon dioxide. The particle size of these carrier center particles is preferably 10–1,000 μm, more preferably 20–300 μm.

The electrophotography carrier particles of the present invention may be prepared by the following method: the coating agent of the present invention, is dissolved in organic solvent as necessary. Suitable solvents include toluene, xylene, solvent gasoline, alcohols and esters. The carrier center particles are coated by suitable methods, for example, fluidized bed methods, impregnation methods, and spray methods, followed by drying and curing to form a coating layer on the surface of the carrier center particles. The film thickness of the coating layer is desirably 0.1–20 μm. It is possible to coat the carrier particles with multiple layers as needed. Each layer of the multi-layered compositions may be different, depending upon the purpose.

The silicone compositions of the present invention may be cured at room temperature, or by heating to 100°–250° C. There are no specific limitations for the toners utilized along with the carriers as a developer. Developers, which were prepared by dispersing the known synthetic dyes into a wide variety of materials comprising the natural resins and composite resins, may be utilized. Composite resins are made of natural resins combined with synthetic resins.

The coating agents for electrophotography carriers of the present invention comprise the organopolysiloxanes as a main constituent. Preferably, the carriers contain 0.1–75 wt. % of the organopolysiloxanes. Therefore, the carrier particles having a coating layer with the coating agents on the center particles hardly show any spent phenomenon. In addition, a humidity curing type of the coating agent can carry out the curing to completion at low temperature. Therefore, its endurance is sufficient and the changes in charge characteristics with time are small. As a result, the electrophotography carriers of the present invention are superior in endurance in every meaning.

Coating agent compositions in accordance with the invention comprise, for example, the organopolysiloxanes and a solvent. Preferably, the coating agent composition comprises:

(1) 100 parts by weight of an organopolysiloxane of the formula

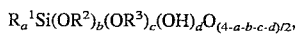

(2) 10 to 100 parts by weight of an oxime-liberating type crosslinking agent,
(3) 0.1 to 3 parts by weight of a curing catalyst, and
(4) 200 to 20,000 parts by weight of solvent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding Japanese patent application 6-113508, filed Apr. 27, 1994, are hereby incorporated by reference.

Below, the invention is explained in detail by using examples. However, the invention is not limited only to these Examples. All the viscosity values are measured at 25° C.

EXAMPLES

Manufacturing Example 1

The following compounds were placed in a flask equipped with a stirrer, a Liebig condenser, a dropping funnel and a thermometer: 49.7 g of the compound expressed by chemical formula (5) below and 5.0 g of $Me_2Si(OMe)_2$ (Me designates a methyl group). Then, after adding 1.2 g of methane sulfonic acid while stirring, 6.0 g of water was further added drop by drop over an hour time period. Then, the mixture was matured at 30° C. for 12 hours.

Pr in formula (5) indicates a propyl group.

Then, the obtained solution was neutralized with sodium bicarbonate. The alcohol by-product was eliminated by distillation, and then washed with water. After dehydration and filtration, the product was diluted with toluene to make the amount of the nonvolatile component be 40%. As a result, the silicone resin (1) having 4.8% of isopropoxyl groups and 2.2% of hydroxyl groups (both of which are weight percentages relative to the solid portion of the resin) with a viscosity of 4.5 cs was obtained under nitrogen atmosphere. Then, 12 parts of methyl tris(methyl ethyl ketoxime) silane, 0.4 parts of a xylene solution containing 50% of dibutyl tin dioctanoate, and solvent gasoline were added under nitrogen atmosphere to 100 parts of the obtained silicone resin (1) so that the nonvolatile component consisted of 25%. The resultant solution resin (A) had a viscosity of 1.8 cs.

Manufacturing Example 2

12 parts of methyl tris(isopropenoxy) silane, 0.4 parts of xylene solution containing 50% of dibutyl tin dioctanoate, and solvent gasoline were added under nitrogen atmosphere to 100 parts of the obtained silicone resin (1) so that the nonvolatile component consisted of 25%. The resultant solution resin (B) had a viscosity of 1.8 cs.

Manufacturing Example 3

In equipment similar to that used in Manufacturing Example 1, 34.8 g of the compound expressed by chemical formula (6) below, 37.5 g of isopropyl alcohol and 1.2 g of methane sulfonic acid were refluxed at about 75° C. for three hours. Then, the temperature was raised to 86° C., and 25.0 g of methanol and isopropyl alcohol were removed by distillation.

After cooling the reaction mixture, 5.0 g of $Me_2Si(OMe)_2$ and 4.2 g of toluene were added and 6.0 g of water further added drop by drop over an hour time period. Then, the mixture was matured at 30° C. for 3 hours.

Then, the obtained solution was neutralized with sodium bicarbonate. The alcohol by-product was eliminated by distillation, and then washed with water. After dehydration and filtration, the product was diluted with toluene to make the amount of the nonvolatile component be 40%. As a result, silicone resin (2) having 2.7% of methoxyl groups, 4.3% of isopropoxyl groups and 2.2% of hydroxyl groups with a viscosity of 4.9 cs was obtained. Then, 12 parts of methyl tris(methyl ethyl ketoxime) silane, 0.4 parts of xylene solution containing 50% of dibutyl tin dioctanoate, and solvent gasoline were added under nitrogen atmosphere to 100 parts of the obtained silicone resin (2) so that the nonvolatile component consisted of 25%. The resultant solution resin (C) had a viscosity of 2.0 cs.

Manufacturing Example 4

The 12 parts of methyl tris(methyl ethyl ketoxime) silane, 0.4 parts of xylene solution containing 50% of aluminum-di-n-butoxide monoethyl acetate (with Al content of 8.9%), and solvent gasoline were added under nitrogen atmosphere to 100 parts of the obtained silicone resin (2) so that the nonvolatile component consisted of 25%. The resultant solution resin (D) had a viscosity of 1.8 cs.

Manufacturing Example 5

Similar to Manufacturing Example 3, 34.8 g of the compound expressed by chemical formula (6), 18.8 g of isopropyl alcohol and 1.2 g of methane sulfonic acid were refluxed at about 75° C. for three hours. Then, the temperature was raised to 86° C., and 10.3 g of methanol and isopropyl alcohol were removed by distillation. After cooling the reaction mixture, 5.0 g of $Me_2Si(OMe)_2$ and 8.7 g of toluene were added and 6.0 g of water was further added drop by drop over an hour time period, Then, the mixture was matured at 30° C. for 3 hours.

Then, the obtained solution was neutralized with sodium bicarbonate. The alcohol by-product was eliminated by distillation, and then washed with water. After dehydration and filtration, the product was diluted with toluene to make the amount of the nonvolatile component be 40%. As a result, silicone resin (3) having 4.8% of methoxy groups, 2.2% of isopropoxyl groups and 1.6% of hydroxyl groups with a viscosity of 5.0 cs was obtained. Then, 12 parts of methyl tris(methyl ethyl ketoxime) silane, 0.4 parts of xylene solution containing 50% of dibutyl tin dioctanoate, and solvent gasoline were added under nitrogen atmosphere to 100 parts of the obtained silicone resin (3) so that the nonvolatile component consisted of 25%. The resultant solution resin (E) had a viscosity of 1.8 cs.

Manufacturing Example 6

In equipment similar to that described in Manufacturing Example 1, 34.8 g of the compound expressed by chemical formula (6), 5.0 g of $Me_2Si(OMe)_2$ and 38.9 g of toluene were added and 1.2 g of methane sulfonic acid was further added while stirring. Then, 6.0 g of water was added drop by drop over an hour time period. Then, the mixture was matured at 30° C. for 12 hours. Then, the obtained solution was neutralized with sodium bicarbonate. The alcohol by-product was eliminated by distillation, and then washed with water. After dehydration and filtration, the product was diluted with toluene to make the amount of the nonvolatile component be 40%. As a result, silicone resin (4) having no isopropoxyl groups was obtained.

Then, 12 parts of methyl tris(methyl ethyl ketoxime) silane, 0.4 parts of xylene solution containing 50% of dibutyl tin dioctanoate, and solvent gasoline were added under nitrogen atmosphere to 100 parts of the obtained silicone resin (4) so that the nonvolatile component consisted of 25%. The resultant solution resin (F) had a viscosity of 1.9 cs. The results of GPC measurements for the silicone resins (1) through (4) were almost the same.

Example 1

A solution made of 25 g of the silicone resin (1) diluted by 275 g of toluene was used to coat the carrier center particles (1 kg of ferrite with 100 μm average particle size) by utilizing a fluidized bed instrument (Spiral Flow Miuni: trade name of the instrument manufactured by Freund Ind., Co., Ltd.) at 100° C. for an over 30 minute period. Then, the carrier agents were prepared by heating them at 150° C. for 30 minutes. Then, 4 parts of positive charge type toner (Able 3300/1300 series toner (black), a trade name of the product manufactured by Fuji Xerox Co., Ltd.) were added to 96 parts of the carrier material and then they were charged by vibration within a polyester bottle (vibration width of 50 mm and vibration rate of 250 times/minute). The charged amount of the toner was measured by a blow-off powder charge meter, manufactured by Toshiba Chemical Co., Ltd.

Example 2

Example 2 was carried out similarly as described in Example 1, except that 25 g of the silicone resin (1) was replaced by 40 g of the silicone resin (A) and the amount of diluting toluene was changed to 260 g.

Example 3

Example 3 was carried out similarly as described in Example 2, except that the silicone resin (A) was replaced by 40 g of the silicone resin (B).

Example 4

Example 4 was carried out similarly as described in Example 2, except that the silicone resin (A) was replaced by 40 g of the silicone resin (C).

Example 5

Example 5 was carried out similarly as described in Example 2, except that the silicone resin (A) was replaced by 40 g of the silicone resin (D).

Example 6

Example 6 was carried out similarly as described in Example 2, except that the silicone resin (A) was replaced by 40 g of the silicone resin (E).

Comparison Example 1

Comparison Example 1 was carried out similarly as described in Example 2, except that the silicone resin (A) was replaced by 40 g of the silicone resin (F).

The results above are listed in Table 1.

TABLE 1

| | \multicolumn{7}{c}{Charge Amount in Carrier (μc/g)} | | | | | | |
|---|---|---|---|---|---|---|---|
| Vibration Time | Ex. 1 | Ex. 2 | Ex. 3 | Ex. 4 | Ex. 5 | Ex. 6 | C. Ex. 1 |
| 15 minutes | −8.5 | −9.9 | −11.1 | −13.2 | −14.6 | −11.9 | −9.4 |
| 1 hour | −11.0 | −13.0 | −14.5 | −15.7 | −15.1 | −16.2 | −13.1 |
| 2 hours | −11.7 | −13.1 | −14.2 | −15.2 | −15.1 | −17.6 | −13.5 |
| 5 hours | −11.5 | −12.0 | −14.3 | −16.4 | −14.7 | −17.5 | −17.1 |
| 24 hours | −12.0 | −14.4 | −15.8 | −16.9 | −14.6 | −18.6 | −18.0 |
| 48 hours | −13.5 | −15.8 | −16.5 | −15.4 | −17.7 | −18.9 | −24.2 |

The results in Table 1 reveal that there is little charge build-up in Examples 1 through 6 as compared to Comparison Example 1, which proves the effectiveness of the present invention. Further, the comparison of Examples 4 and 6 indicates that there is less charge build-up in Example 4, which suggests that isopropoxyl groups in the silicone resin are particularly effective. Further, Example 2 contains many isopropoxyl groups but no methoxyl groups. Therefore, it took time to stabilize the charge initially; then it later stabilized as seen in Example 4.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A carrier particle composition comprising:

electrophotography carrier particles coated with a covering agent, wherein said covering agent contains an organopolysiloxane of the formula:

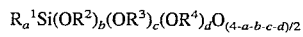

wherein $R^1$ is, in each case independently, an organic group with 1 to 12 carbon atoms;

$R^2$ is, in each case independently, $-C_mH_{2m+1}$;

$R^3$ is, in each case independently, $-C_nH_{2n+1}$;

m is ≧3;

n is 1 or 2;

$R^4$ is, in each case independently, a hydrogen atom or a group expressed by formulae (1) or (2)

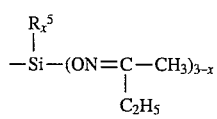  (1)

or

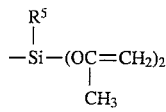  (2)

$R^5$ is, in each case independently, an organic group with 1 to 6 carbon atoms;

x is a number which satisfies 1≦x≦2; and subscripts a, b, c, and d are numbers which satisfy the following conditions:

$$0.5<a<2, 0<b≦3, 0<c≦3, 0<d≦0.5$$

and $$0.5<a+b+c+d<4$$

wherein the amount of alkoxy groups $OR^2$ is 0.5–10 mole % with respect to the organopolysiloxane.

2. A composition according to claim 1, wherein said carrier particles have a particle size of 10–1,000 μm and are particles of magnetic metals or magnetic metal oxides.

3. A composition according to claim 1, wherein said carrier particles have a particle size of 10–1,000 μm and are iron powder particles or ferrite powder particles.

4. An composition according to claim 1, wherein subscript b satisfies 0<b≦0.5.

5. A composition according to claim 1, wherein $OR^2$ is isopropoxy and $OR^3$ is methoxy.

6. A composition according to claim 1, wherein said covering agent contains:

(1) 100 parts by weight of an organopolysiloxane of the formula

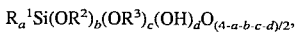

(2) 10 to 100 parts by weight of an oxime-liberating crosslinking agent, (3) 0.1 to 3 parts by weight of a curing catalyst, and (4) 200 to 20,000 parts by weight of solvent.

7. A composition according to claim 1, wherein said organopolysiloxane is of the formula

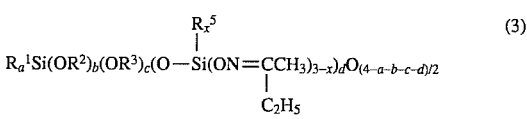  (3)

wherein $R^2$ is an organic group with 1 to 12 carbon atoms;

$R^2$ is $-C_mH_{2m+1}$;

$R^3$ is $-C_nH_{2n+1}$;

$R^5$ is an organic group with 1 to 6 carbon atoms;

x is a number which satisfies 1≦x≦2; and subscripts a, b, c and d are numbers which satisfy the following conditions:

$$0.5<a<2, 0<b≦3, 0<c≦3, 0<d≦0.5$$

and $$0.5<a+b+c+d<4.$$

8. A composition according to claim 1, wherein said organopolysiloxane is of the formula

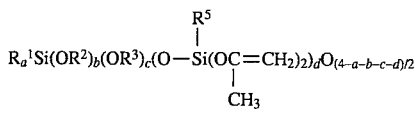 (4)

wherein
- $R^1$ is an organic group with 1 to 12 carbon atoms;
- $R^2$ is $-C_mH_{2m+1}$;
- $R^3$ is $-C_nH_{2n+2}$;
- $R^5$ an organic group with 1 to 6 carbon atoms;
- x is a number which satisfies $1 \leq x \leq 2$; and
- subscripts a, b, c and d are numbers which satisfy the following conditions:

$0.5 < a < 2, 0 < b \leq 3, 0 < c \leq 3, 0 < d \leq 0.5$ and $0.5 < a+b+c+d < 4.$ 9. A composition according to claim 1, wherein m is 3–8.

10. A process of coating electrophotography carrier particles comprising:

coating said carrier particles with a composition containing a solvent and one or more organopolysiloxanes of the formula

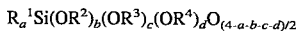

wherein
- $R^1$ is, in each case independently, an organic group with 1 to 12 carbon atoms;
- $R^2$ is, in each case independently, $-C_mH_{2m+1}$;
- $R^3$ is, in each case independently, $-C_nH_{2n+1}$;
- m is $\geq 3$;
- n is 1 or 2;
- $R^4$ is, in each case, independently, a hydrogen atom or group expressed by formulae (1) or (2)

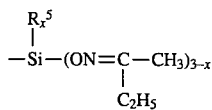 (1)

or

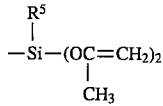 (2)

- $R^5$ is, in each case independently, an organic group with 1 to 6 carbon atoms;
- x is a number which satisfies $1 \leq x \leq 2$; and
- subscripts a, b, c, and d are numbers which satisfy the following conditions:

$0.5 < a < 2, 0 < b \leq 3, 0 < c \leq 3, 0 < d \leq 0.5$ and $0.5 < a+b+c+d < 4;$ wherein the amount of alkoxy groups $OR^2$ is 0.5–10 mole % with respect to the organopolysiloxane and drying and curing said composition to form a coating layer on the surfaces of said carrier particles.

11. A process according to claim 10, wherein said organopolysiloxane is of the formula

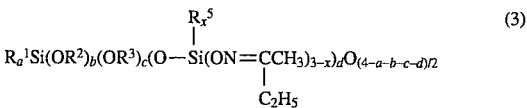 (3)

wherein
- $R^1$ is an organic group with 1 to 12 carbon atoms;
- $R^2$ is $-C_mH_{2m+1}$;
- $R^3$ is $-C_nH_{2n+1}$;
- $R^5$ is an organic group with 1 to 6 carbon atoms;
- x is a number which satisfies $1 \leq x \leq 2$; and
- subscripts a, b, c, and d are numbers which satisfy the following conditions:

$0.5 < a < 2, 0 < b \leq 3, 0 < c \leq 3, 0 < d < 0.5$ and $0.5 < a+b+c+d < 4.$

12. A process according to claim 11, wherein said organopolysiloxane is obtained by crosslinking an organopolysiloxane of the following formula

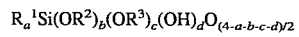

with an oxime elimination type crosslinking agent selected from methyl-tris(methyl ethyl ketoxime) silane, vinyl-tris-(methyl ethyl ketoxime) silane, phenyl-tris(methyl ethyl ketoxime) silane or dimethyl-di(methyl ethyl ketoxime) silane.

13. A process according to claim 10, wherein said organopolysiloxane is of the formula

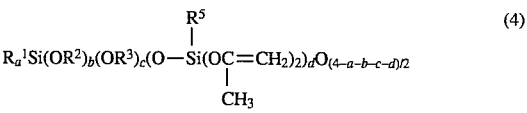 (4)

wherein
- $R^1$ is an organic group with 1 to 12 carbon atoms;
- $R^2$ is $-C_mH_{2m+1}$;
- $R^3$ is $-C_nH_{2n+1}$;
- $R^5$ is an organic group with 1 to 6 carbon atoms;
- x is a number which satisfies $1 \leq x \leq 2$; and
- subscripts a, b, c, and d are numbers which satisfy the following conditions:

$0.5 < a < 2, 0 < b \leq 3, 0 < c \leq 3, 0 < d \leq 0.5$ and $0.5 < a+b+c+d < 4.$ 14. A process according to claim 13, wherein said organopolysiloxane is obtained by crosslinking an organopolysiloxane of the following formula

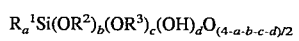

with an acetone elimination type crosslinking agent selected from methyl-tris(isopropenoxy) silane, vinyl-tris(isopropenoxy) silane or phenyl-tris(isopropenoxy) silane.

15. A process according to claim 10, wherein said composition further contains a curing catalyst and said curing catalyst is an organotin compound or an organoaluminum compound.

16. A process according to claim 10, wherein $OR^2$ is isopropoxy and $OR^3$ is methoxy.

17. A process according to claim 10, wherein m is 3–8.

18. A process according to claim 12, wherein the amount of said oxime elimination type crosslinking agent used for crosslinking is 0.4–5 moles per mole of silanols in the organopolysiloxane of the formula $$R_a^1Si(OR^2)_b(OR^3)_c(OH)_dO_{(4-a-b-c-d)/2}.$$

19. A process according to claim 14, wherein the amount of said acetone elimination type crosslinking agent used for crosslinking is 0.4–5 moles per mole of silanols in the organopolysiloxane of the formula $$R_a^1Si(OR^2)_b(OR^3)_c(OH)_dO_{(4-a-b-c-d)/2}.$$

20. A process according to claim 10, wherein said composition contains:

(1) 100 parts by weight of an organopolysiloxane of the formula $$R_a^1Si(OR^2)_b(OR^3)_c(OH)_dO_{(4-a-b-c-d)/2},$$

(2) 10 to 100 parts by weight of an oxime-liberating crosslinking agent, (3) 0.1 to 3 parts by weight of a curing catalyst, and (4) 200 to 20,000 parts by weight of solvent.

21. A process according to claim 10, wherein subscript b satisfies $0<b\leq0.5$.

* * * * *